United States Patent
Menkhoff et al.

(10) Patent No.: US 7,577,217 B2
(45) Date of Patent: Aug. 18, 2009

(54) DETECTOR FOR CLOCK PHASE AND CARRIER PHASE

(75) Inventors: Andreas Menkhoff, Oberhaching (DE); Norbert Neurohr, Neuried (DE)

(73) Assignee: Infineon Technologies AG, Munich (DE)

( * ) Notice: Subject to any disclaimer, the term of this patent is extended or adjusted under 35 U.S.C. 154(b) by 615 days.

(21) Appl. No.: 11/238,770

(22) Filed: Sep. 28, 2005

(65) Prior Publication Data

US 2006/0067438 A1    Mar. 30, 2006

(30) Foreign Application Priority Data

Sep. 29, 2004    (DE) .................. 10 2004 047 398

(51) Int. Cl.
*H03D 1/00*    (2006.01)
*H03D 3/24*    (2006.01)

(52) U.S. Cl. ...................... 375/343; 375/375

(58) Field of Classification Search ................ 375/375, 375/343, 340, 316, 373, 371, 354

See application file for complete search history.

(56) References Cited

U.S. PATENT DOCUMENTS 3,906,337 A * 9/1975 Depenbrock ............... 363/48
4,764,940 A * 8/1988 Paneth et al. .............. 375/308
5,203,023 A * 4/1993 Saito et al. ................ 455/133
5,608,764 A * 3/1997 Sugita et al. .............. 375/344
5,729,701 A * 3/1998 Eriksson ................... 710/110

OTHER PUBLICATIONS

Carlson, Bruce; "Communication Systems: An Introduction to Signals and Noise in Electrical Communication"; Forth Edition, 2002; p. 332, ISBN 0-07-121028-8.*

* cited by examiner

*Primary Examiner*—David C Payne
*Assistant Examiner*—Brian J Stevens
(74) *Attorney, Agent, or Firm*—Brinks Hofer Gilson & Lione

(57) ABSTRACT

A detector for a receiver generates a clock phase detection signal and a carrier phase detection signal from of a plurality of clock polyphase signals of an oversampled signal. The detector comprises a plurality of carrier phase detectors, a plurality of variance estimation units, a selection unit and an output unit. Each phase detector determines the carrier phase of a clock polyphase signal and emits a carrier phase signal corresponding to the carrier phase. Each variance estimation unit determines the variance of one of the carrier phase signals. The selection unit compares the variances of the carrier phase signals with one another and emits a selection signal as the clock phase detection signal for selection of that clock polyphase signal whose associated carrier phase has the smallest variance. The output unit emits at least one of the carrier phase signal as the carrier phase detection signal.

15 Claims, 9 Drawing Sheets

DD detector

FIG 4
Prior art

NDA detector

$\varphi_{in} = 50°$
$\varphi' = 50° - 0 = 50°$ $\quad (\varphi_c = 0)$
$\varphi'' = 50° \cdot \text{mod}(\frac{360°}{4})$ $\quad (m=4)$
$\quad = 50°$
$\varphi''' = 50° - (\frac{360°}{2 \cdot 4}) = 5°$

FIG 11

DETECTOR FOR CLOCK PHASE AND CARRIER PHASE

CLAIM FOR PRIORITY

This application claims the benefit of priority to German Patent Application DE 10 2004 047 398.6, filed on Sep. 29, 2004, herein incorporated by reference in its entirety.

BACKGROUND OF THE INVENTION

1. Field of the Invention

The invention relates to a detector for a receiver, which at the same time produces a clock phase detection signal for identification of a clock phase, and a carrier phase detection signal for identification of a carrier phase, of a received signal which is received by the receiver.

2. Description of the Prior Art

Figure 1:
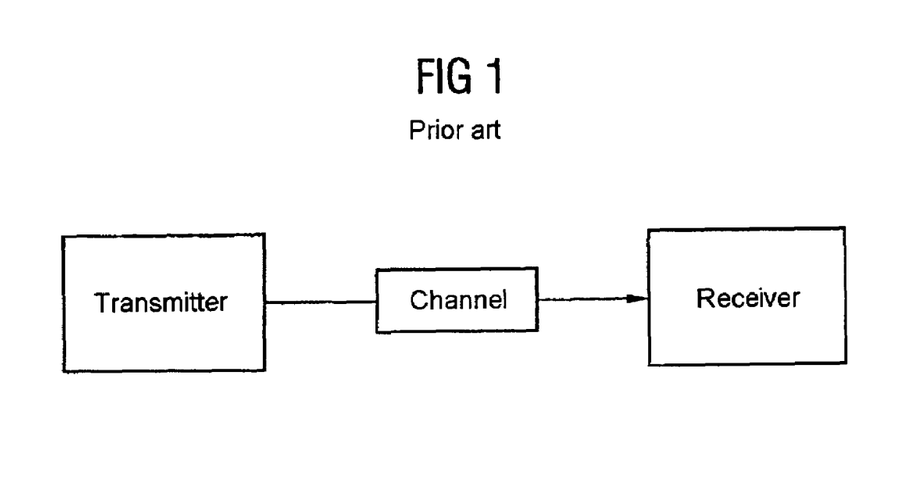
FIG. 1 is a transmitting/receiving arrangement according to the prior art.

FIG. 1 shows an arrangement according to the prior art. A transmitter with an internal data source sends a modulated transmission signal via a transmission channel to a receiver. The receiver is generally a free-running receiver, that is to say it does not receive any separate synchronization signals from the transmitter, but determines the clock and carrier phase from the received signal.

Figure 2:
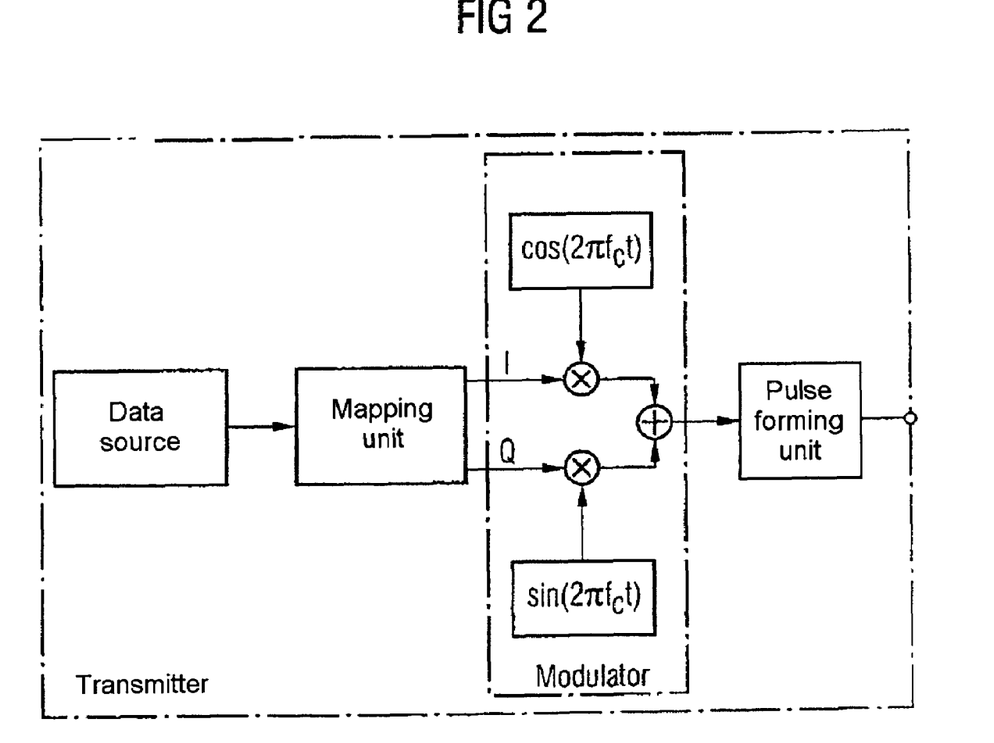
FIG. 2 is a transmitter according to the prior art.

FIG. 2 shows a transmitter according to the prior art, as is illustrated in FIG. 1. The transmitter contains a data or bit source, which emits a data bit stream to a mapping unit. The mapping unit in each case maps a plurality of data items in the data bit stream onto a complex data symbol. For example, one data symbol comprises two bits. In this case, by way of example, the first bit of the data symbol determines the real part (I) and the second bit determines the imaginary part (Q) of the data symbol to be transmitted. A modulator modulates a cosinusoidal carrier signal, which is at a carrier frequency $f_c$ (C: carrier) onto the real part (I). This is done by multiplying the real part by the carrier signal. In the same way, the imaginary part (Q) is multiplied by a sinusoidal carrier signal, which is likewise at the carrier frequency ($f_c$). An adder adds the modulated real part and the modulated imaginary part, and applies the sum signal to a pulse shaping filter within the transmitter. The pulse shaping filter matches the transmission signal to the transmission channel.

The stream of data symbols emitted from the data source is at a specific clock frequency or symbol frequency $f_T$. For data symbol detection, the receiver must identify the phase of the carrier signal, and the clock phase. The clock frequency or symbol frequency at which the data source emits the data symbols is generally known to the receiver. Conventional receivers according to the prior art have a first control loop for carrier synchronization, and a second control loop for clock synchronization to the received signal. The control loop for carrier synchronization includes a carrier phase detector, which determines the discrepancy from a desired, predetermined nominal carrier phase. The control loop for clock synchronization includes a clock phase detector, which determines the discrepancy from a desired predetermined clock phase.

Carrier phase detectors are conventionally subdivided into two different groups, specifically into the group of so-called DD carrier phase detectors, and into the group of so-called NDA carrier phase detectors. In the case of synchronization of the receiver to the carrier signal, the carrier phase and the carrier frequency of the modulated received signal are not known in advance. The phase discrepancy between the received signal and the desired nominal phase is calculated for carrier synchronization by the carrier phase detector by means of a carrier phase loop, which forms a control loop.

Figure 3:
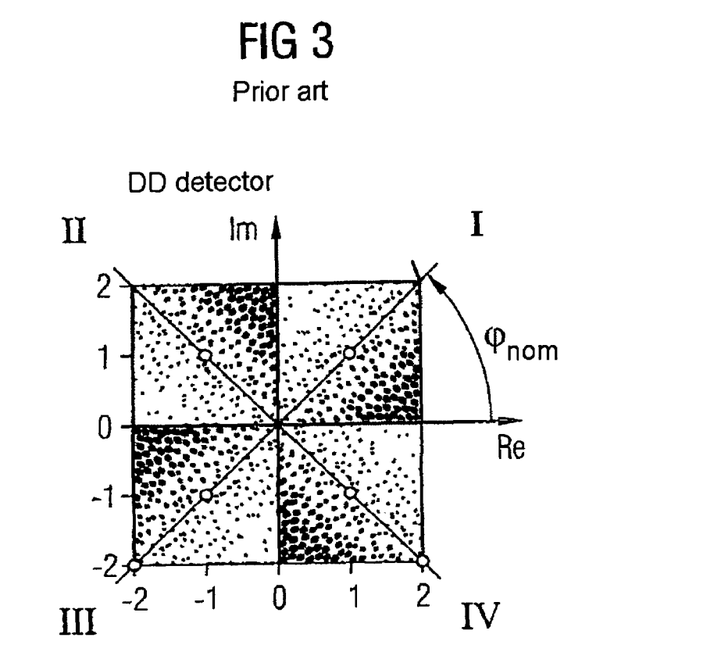
FIG. 3 is a diagram explaining the method of operation of a DD detector according to the prior art.

FIG. 3 shows the calculated feedback signal for a DD carrier phase detector according to the prior art on the complex plane, with the x axis representing the real part of the received data symbol, and the y axis representing the imaginary part of the received data symbol. The DD carrier phase detector according to the prior art weights the input data symbols linearly as follows:

$$D = -Re\ \text{Sign}(Im) + Im \cdot \text{Sign}(Re) \quad (1)$$

The darker the shading in FIG. 3, the more negative is the value of the feedback signal D emitted from the DD carrier phase detector.

By way of example, the situation for the following four received data symbols $E_1$ is shown in the following table:

TABLE 1

|    | $E_1$ | $E_2$ | $E_3$ | $E_4$ |
|----|-------|-------|-------|-------|
| Re | 1     | 1.1   | 0.1   | 1.9   |
| Im | 1     | 0.9   | 1.9   | 0.1   |
| D  | 0     | −0.2  | +1.8  | −1.8  |

If the received data symbol is located in the upper left-hand corner of the first quadrant of the complex plane (for example $E_3$=(0.1; 1.9), the value of the emitted feedback signal D has a high positive value (for example $D_3$=+1.8).

If the received data symbol is in the right-hand lower corner of the first quadrant of the complex plane (for example $E_4$= (1.9; 0.1), a high negative value is emitted from the carrier phase detector as the feedback signal ($D_4$=−1.8).

Four equidistant nominal data symbols are defined for a 4 PSK-modulated signal, for example:

$E_{nom}1 = (+1; +1);$ $E_{nom}2 = (-1; +1)$ $E_{nom}3 = (-1; -1)$ $E_{nom}4 = (+1; -1)$ In this case, the four (m=4) different nominal data symbols $E_{nom}$ are located in the four different quadrants (I-IV) of the complex plane, as illustrated in FIG. 3.

In the example illustrated in FIG. 3, the nominal phase for the four nominal data symbols is $E_{nom}$=45°.

The DD carrier phase detector calculates the feedback signal D for each received data symbol, which has a nominal phase of $\phi$=45° for D=0.

One disadvantage of DD detectors according to the prior art is that the calculation of the Equation (1) which corresponds to the feedback signal D involves a hard transition occurring between the individual decisions. A light region with a high positive feedback signal value and a dark region with a relatively high negative feedback signal value D are located immediately alongside one another, as can be seen from FIG. 3. When the feedback signal value D has a high positive value of, for example, +1.8, the carrier phase loop rotates in the clockwise sense, while the carrier phase loop rotates in the anticlockwise sense when the feedback signal value has a high negative value of, for example, D=−1.8.

In the case of the DD carrier phase detector according to the prior art and as illustrated in FIG. 3, those received data symbols which are located at the boundary between the phases of two nominal data symbols are more strongly weighted than received data symbols which are located in the vicinity of the nominal phase of φ=45°. For example, the received data symbols $E_3$, $E_4$, which have a relatively phase discrepancy with respect to the nominal received data symbol $E_{nom}1=(1; 1)$ lead to a feedback signal D with a large amplitude, specifically $D_3=+1.8$ and $D_4=-1.8$. In contrast, a received data symbol which has a relatively small phase discrepancy with respect to the nominal data symbol ($E_{nom}=1.1$)), specifically the received data symbol $E_2=(1.1; 0.9)$, leads to a feedback signal value of D=−0.2, that is to say the amplitude of the feedback signal of a received data symbol which has a relatively small phase discrepancy with respect to the nominal received data symbol is less than the amplitude of the feedback signal D for a received data symbol which has a relatively high phase discrepancy between it and the nominal data symbol. Now, however, particularly those received data symbols which have a relatively high phase discrepancy with respect to a nominal data symbol are in fact relatively unreliable. For example, a received data symbol E=(1, 0) has the same phase discrepancy with respect to the nominal data symbol in the first quadrant ($E_{nom}=(1, 1)$) and with respect to the nominal data symbol in the fourth quadrant ($E_{nom}4=(1, -1)$). The probability of a received data symbol $E_{nom}$ which is located precisely on the boundary corresponding to the first nominal data symbol $E_{nom}1$ or to the fourth received data symbol is 50%. The DD phase carrier phase detector according to the prior art and as shown in FIG. 3 thus does not take account of the reliability probability of the received data symbol, and the variance of the signal amplitudes of the feedback signal D, which is calculated by the DD carrier phase detector according to the prior art, is relatively high. In a corresponding manner, the power gain of the downstream digital loop filter must be reduced, so that the stabilization times of a carrier phase loop which uses a DD carrier phase detector according to the prior art and as shown in FIG. 3 are relatively long. In the event of a rapid change in the received signal, the receiver is thus not able to quickly follow the signal, so that the bit error rate rises.

Figure 4:
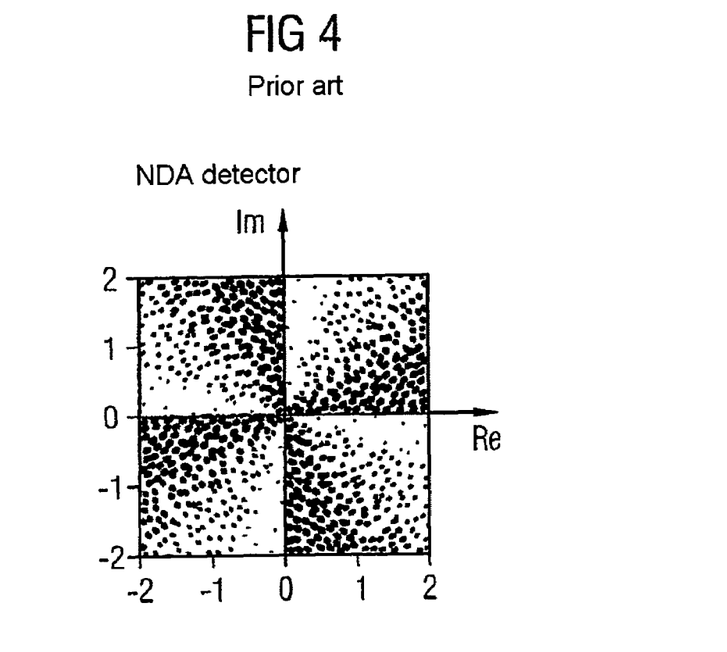
FIG. 4 is a diagram explaining the method of operation of an NDA detector according to the prior art.

FIG. 4 shows, on the complex plane, a feedback signal D which is calculated by an NDA carrier phase detector according to the prior art. An NDA carrier phase detector such as this is described, for example, by A. J. Viterbi and A. M. Viterbi "non linear estimation of PSK-modulated carrier phase with application to burst digital transmission" in IEEE TransInfoTheory Vol. IT-32, pages 543-551 (July 1983). The feedback signal D for Q PSK and 4 PSK is calculated using the following equation:

$$D = \frac{r^x \cdot \text{Mod}\left[\text{Arg}((\text{Re} + j \cdot \text{Im})^4) + 2\pi, 2\pi\right] - \pi}{2} \quad (2)$$

where, in principle, x is freely variable, but x is normally set to be equal to 0, so that:

$$r = \sqrt{\text{Re}^2 + \text{Im}^2} = 1 \quad (3)$$

The following values are obtained for the digital feedback signal D for four examples of received data symbols $E_1$-$E_4$ with an NDA carrier phase detector such as this:

TABLE 2

|    | $E_1$ | $E_2$  | $E_3$  | $E_4$  |
|----|-------|--------|--------|--------|
| Re | 1     | 1.1    | 0.1    | 1.9    |
| Im | 1     | 0.9    | 1.9    | 0.1    |
| D  | 0     | −0.199 | +1.466 | −1.466 |

The NDA carrier phase detector according to the prior art and as illustrated in FIG. 4 has the same disadvantage as that already mentioned with the conventional DD detector according to the prior art as shown in FIG. 1, however, that there is a hard transition between the individual decisions.

Owing to the high signal variance of the calculated feedback signal D, the stabilization behavior of a carrier phase loop which has an NDA carrier phase detector such as this is relatively poor. This means that the carrier phase loop stabilizes only slowly, since the loop gain of the downstream digital loop filter must be set to be relatively low.

Conventional receivers have two separate circuits for carrier synchronization and for clock synchronization, that is to say a first control loop is provided for carrier synchronization with a carrier phase detector, and a second loop is provided for clock synchronization with a clock phase detector contained in it. In this case, the clock phase is determined first, followed by the carrier phase, sequentially. Once the clock phase has been determined, that is to say once the correct sampling time is known, the carrier phase is then determined in conventional receivers. In order to determine the clock and carrier phase, the transmitter sends a training sequence, which is known to the receiver, via the transmission channel. The sequential determination of the clock phase and of the carrier phase within the receiver has the serious disadvantage, however, that respectively half and only a portion of the entire signal length of the training sequence is in each case available for determination of the clock phase and for determination of the carrier phase. However, the training sequence that is emitted from the transmitter has only a relatively short signal length. In consequence, the variance in the estimation of the clock phase and in the estimation of the carrier phase in the receiver is very high. Because of the relatively inaccurate estimate of the carrier phase and of the clock phase, the subsequent control process in the receiver is relatively inaccurate, so that the error rate for detection of the received data symbols rises.

A further disadvantage of the separate control loops for carrier synchronization and for clock synchronization is that two separate detectors must be provided within the receiver, specifically one detector for identification of the carrier phase and one detector for identification of the clock phase. The circuitry complexity or overhead within the receiver is thus relatively high.

European patent EP 451 289 B1 describes a detector for a receiver for production of a clock phase detection signal and of a carrier phase detection signal as a function of a plurality of clock polyphase signals from an oversampled received signal. The detector has a plurality of carrier phase detectors, to each of which a clock polyphase signal is applied, and which determine a carrier phase of the respectively applied clock polyphase signal. The detector furthermore contains means for determination of the clock phase of the data emitted by the carrier phase detectors.

SUMMARY OF THE INVENTION

It is an object of the present invention to provide a detector for simultaneous identification of the clock phase and of the carrier phase of a received signal, which can be implemented with relative little circuitry complexity and which also estimates the carrier phase and the clock phase with sufficient accuracy even when the signal length of the transmitted training sequence is short, so that the error rate for identification of the data symbols during subsequent data transmission is relative small.

The object is achieved in accordance with the invention by means of a detector for a receiver for production of a clock phase detection signal and of a carrier phase detection signal as a function of a plurality of clock polyphase signals from an oversampled received signal having:

(a) a plurality of carrier phase detectors, to each of which a clock polyphase signal is applied and which determine the carrier phase of the respectively applied clock polyphase signal and emit this as a carrier phase signal;

(b) a plurality of variance estimation units, to each of which a carrier phase signal which is emitted from a carrier phase detector is applied and which estimate the variance of the respectively applied carrier phase signal;

(c) a selection unit, which compares the variances of the carrier phase signals as estimated by the variance estimation units with one another and emits a selection signal as the clock phase detection signal for selection of that clock polyphase signal whose associated carrier phase has the smallest variance and having (d) an output unit which emits at least one carrier phase signal as the carrier phase detection signal.

In a restricted version of the inventive detector, the output unit is a multiplexer whose inputs are connected to the carrier phase detectors and which cyclically passes on the applied carrier phase signals.

In a further restricted version of the inventive detector, the multiplexer has a control input which is connected to a counter.

In another restricted version of the inventive detector the output unit is a multiplexer, whose input is connected to the carrier phase signal and which passes on that carrier phase signal whose variance is the smallest as a function of the selection signal which is emitted by the selection unit.

In this case, each variance estimation unit may have a calculation unit which squares the applied carrier phase signal, and a digital averaging filter, which emits the expected value or mean value of the carrier phase signal which has been squared by the calculation unit.

In another restricted version of the inventive detector the carrier phase detection signal ($DS_{cp}$) which is emitted by the output unit is emitted to a further digital averaging filter which filters out a mean value of the carrier phase detection signal.

In a further restricted version of the inventive detector, the oversampled received signal is a complex received signal, which has a real signal component (I) and an imaginary signal component (Q).

The inventive detector may be a phase calculation unit which calculates a phase angle of the received signal as a function of the real signal component (I) and of the imaginary signal component (Q) of the received signal, and emits this as a phase angle input signal.

The inventive detector may comprise an adder, which adds the filtered mean value of the carrier phase detection signal ($DS_{cp}$) and the phase angle input signal (which is emitted from the phase calculation unit) to form a sum signal.

In another restricted version of the inventive detector, a demultiplexer is also provided which receives at one input the sum signal emitted from the adder and subdivided into the clock polyphase signals, each of which is emitted via one output of the demultiplexer.

For this purpose, the demultiplexer may have a control input, which is connected to a counter.

The counter may be a cyclic counter which applies a cyclic count to the control input of the demultiplexer.

In another restricted version of the inventive detector, the outputs of the demultiplexer are each connected to one input of a selection multiplexer which is driven by the clock phase detection signal ($DS_{TP}$).

The object is also achieved in accordance with the invention by means of a detector for a receiver for production of a clock phase detection signal and of a carrier frequency detection signal as a function of a plurality of clock polyphase signals from an oversampled difference-modulated and incoherently received signal having:

(a) a plurality of carrier phase detectors, to each of which a clock polyphase signal is applied and which determine the carrier phase of the respectively applied clock polyphase signal and emit this as a carrier phase signal;

(b) a plurality of variance estimation units, to each of which a carrier phase signal which is emitted from a carrier phase detector is applied and which estimate the variance of the respectively applied carrier phase signal;

(c) a selection unit, which compares the variances of the carrier phase signals as estimated by the variance estimation units with one another and emits a selection signal as the clock phase detection signal for selection of that clock polyphase signal whose associated carrier phase has the smallest variance and having (d) an output unit which emits at least one carrier phase signal as the carrier frequency detection signal.

This is possible because a carrier frequency discrepancy in the case of a differentially modulated and incoherently received received signal is evident as a phase offset.

DESCRIPTION OF THE PREFERRED EMBODIMENTS

Figure 5:
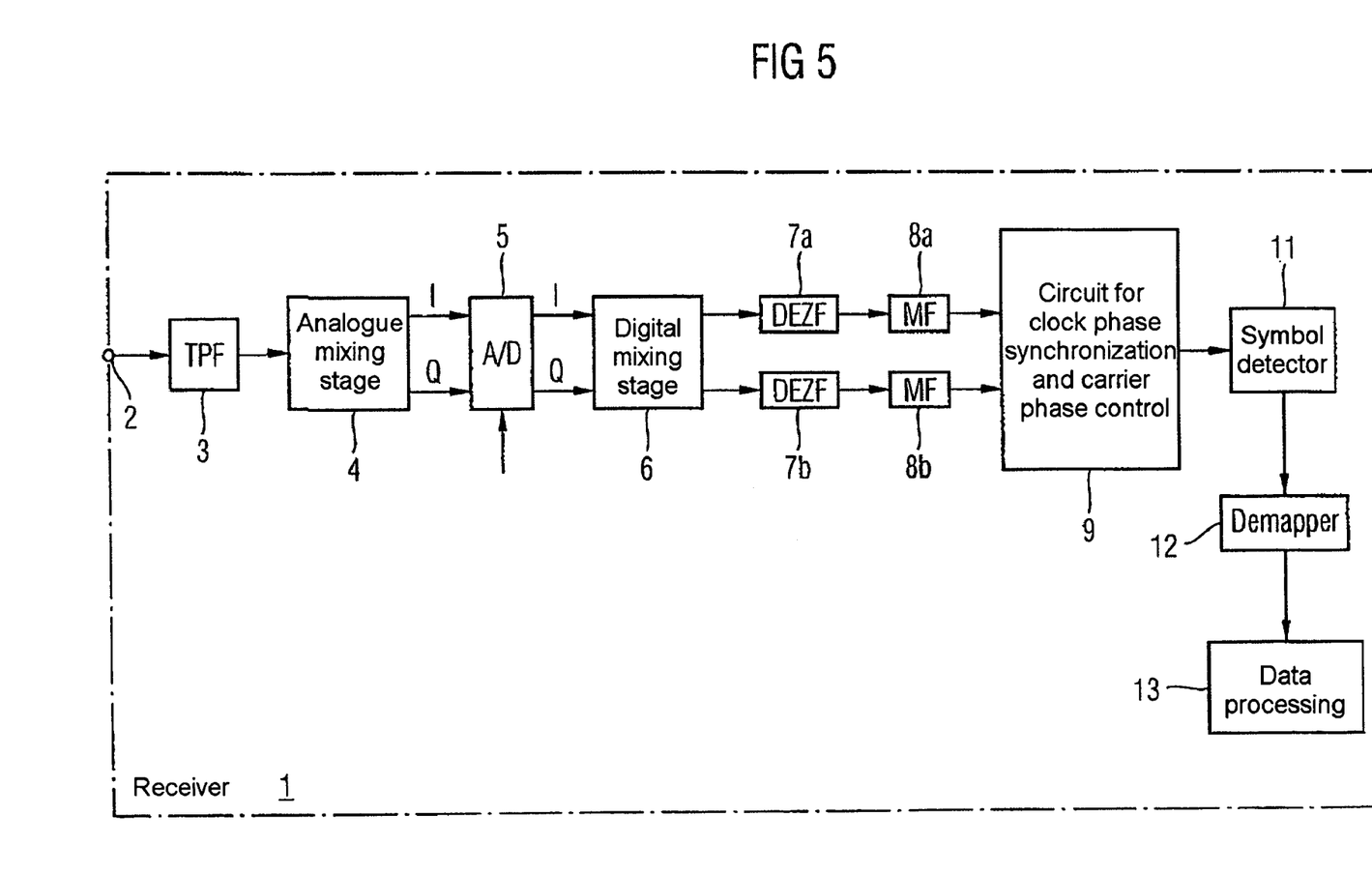
FIG. 5 is a block diagram of a receiver which comprises a circuit for clock phase synchronization and carrier phase control.

As can be seen from FIG. 5, the receiver 1 has a signal input 2, via which the receiver 1 receives the received signal which is received via the transmission channel. The modulated received signal is, for example, a QAM-modulated or PSK-modulated received signal. The received signal is then filtered by an analogue low-pass filter 3. The analogue low-pass filter 3 reduces interference noise components. The filtered analogue input signal is then supplied to an analogue mixing stage 4, which separates the analogue input signal into a real signal component (I) and an imaginary signal component (Q). An analogue/digital converter 5 samples the real signal component (I) and the imaginary signal component (Q) at a sampling frequency $f_{absample}$, and emits the digitized real part and the digitized imaginary part of the received signal to a downstream digital mixing stage 6. The sampling frequency is greater than or equal to the clock frequency $f_T$ of the modulated received signal. The sampling frequency is generally considerably higher than the clock frequency $f_T$, that is to say the received signal is oversampled by the analogue/digital converter 5. The digital mixing stage 6 in the receiver 1 multiples the real part I by a cosinuosidal signal, whose frequency corresponds to the carrier frequency $f_c$ of the transmission signal. The imaginary part Q is multiplied by the digital mixing stage 6 by an inverted sinusoidal signal, whose frequency likewise corresponds to the carrier frequency $f_c$ of the received signal. In this case, both the cosinusoidal signal and the sinusoidal signal which is used for demodulation by the digital mixing stage have a phase discrepancy $\phi_{offset}$ with respect to the received signal. The downstream circuit for clock phase synchronization and carrier phase control is intended to determine the optimum sampling phase, and to compensate for these phase offsets of the carrier signals.

The datastream which is emitted from the digital mixing stage 6 is at the sampling frequency $f_{absample}$ of the analogue/digital converter 5. Downstream decimation filters 7a, 7b decimate the frequency by a deformation factor, for which:

$$\text{Decimation factor} = \frac{f_{absample}}{n \cdot f_T'}$$

where $f_T$ represents the symbol frequency or clock frequency, and n represents the number of clock polyphases evaluated in the circuit for clock phase synchronization and carrier phase control.

Figure 6:
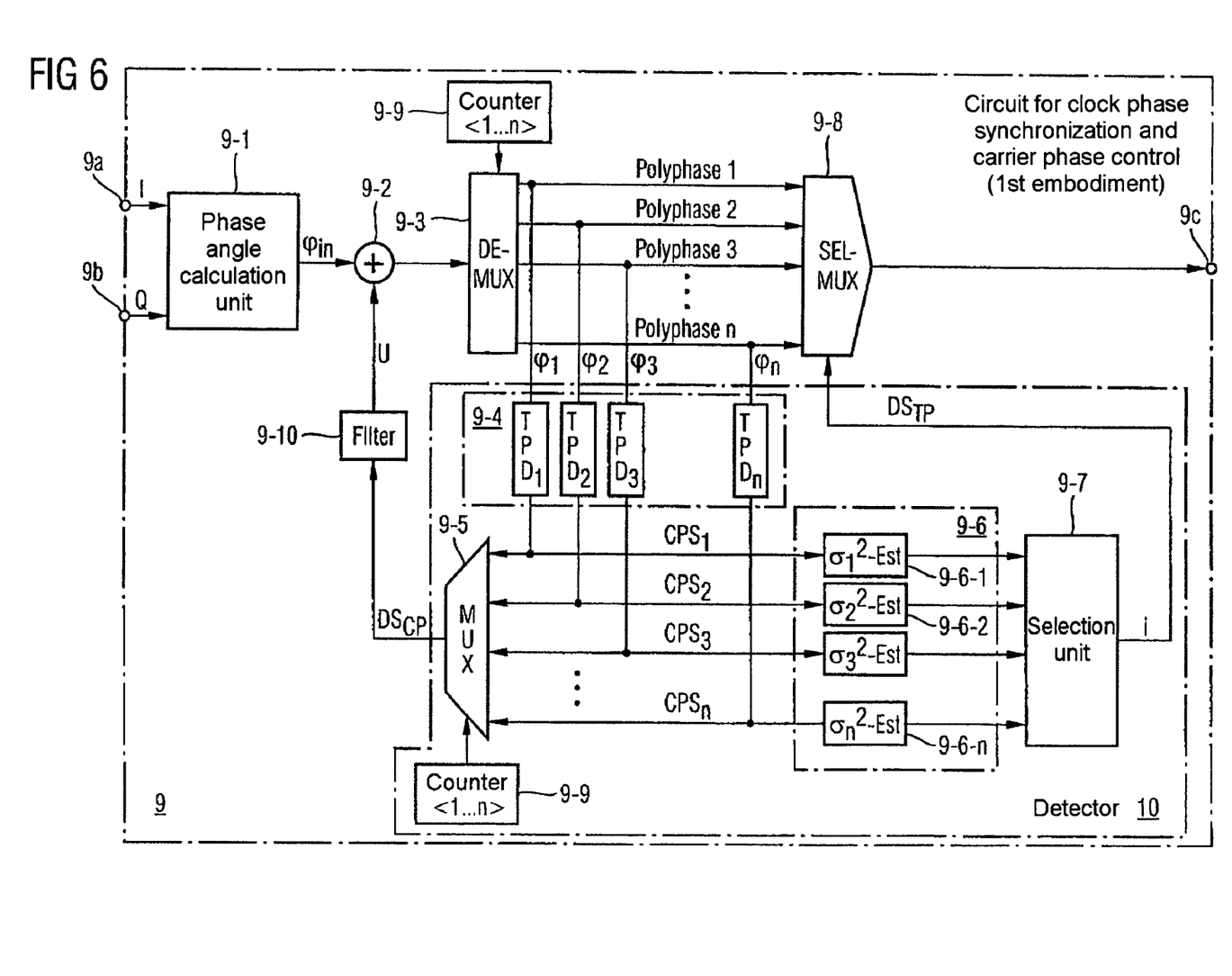
FIG. 6 is a block diagram of a circuit for clock phase synchronization and for carrier phase control, which comprises a detector according to a first exemplary embodiment.

The decimated real and imaginary signal components of the oversampled received signal are then filtered by means of matched filters 8a, 8b and are supplied to a circuit 9 for clock phase synchronization and carrier phase control, which is illustrated in FIG. 6. The circuit 9 for clock phase synchronization and carrier phase control has a first signal input 9a for reception of the real part (I) and a signal input 9b for reception of the imaginary part (Q) of the oversampled received signal. A phase angle calculation unit 9-1 calculates the phase angle $\phi_{in}$ of the received signal as a function of the real and imaginary signal components:

$$\varphi_{in} = \arctan\frac{Q}{I}$$

The phase angle calculation unit 9-1 emits the phase angle input signal to an adder 9-2. The adder 9-2 adds the phase angle input signal to the filtered feedback signal to form a sum signal, which is applied to one input of a demultiplexer 9-3. The demultiplexer 9-3 has n demultiplexer outputs and one control input for application of a control signal. The control signal input of the demultiplexer 9-3 is connected via a control line to the output of a counter 9-4. The counter 9-4 counts cyclically up to a value n corresponding to the number of demultiplexer outputs. The demultiplexer 9-3 breaks down the sum signal emitted from the adder 9-2 into n clock polyphase signals, which are emitted via the outputs of the demultiplexer 9-3.

The received signal, which is converted by the analogue/digital converter 5, is oversampled and thus produces a quantized and discrete-time signal, which is emitted to the circuit 9 for clock phase synchronization and carrier phase control. By way of example, eight sample values are emitted to the circuit 9 for each data symbol. In the quoted example, the circuit 9 for clock phase synchronization and carrier phase control determines an optimum sample value in the group of eight sample values for subsequent detection of the received data symbol. For this purpose, either one sample value is selected, or an interpolation process is carried out between adjacent sample values.

The demultiplexer 9-3 breaks down the phase input signal into eight clock polyphase signals (n=8). The polyphase signals are supplied to a unit 9-4, which comprises n parallel-connected carrier phase detectors TPD. Each clock polyphase signal is supplied to an associated carrier phase detector TPD. The respective carrier phase detector $TPD_i$ uses the applied clock polyphase signal to determine its carrier phase, and then emits an appropriate carrier phase signal ($CPS_i$). The carrier phase signals $CPS_i$ are supplied on the one hand to in each case one input of a multiplexer 9-5, and on the other hand to one input of a unit 9-6, which comprises a plurality of parallel-connected variance estimation units. The number of multiplexer inputs of the multiplexer 9-5 and the number of inputs of the variance estimation apparatus 9-6 correspond to the number n of clock polyphases. The variance estimation apparatus 9-6 has n variance estimation units 9-6-1, 9-6-2, ..., 9-6-n, with one carrier phase signal ($CPS_i$) being applied to each respective variance estimation unit 9-6-i. A variance estimation unit 9-6-i estimates the variance of the respectively applied carrier phase signal ($CPS_i$). The signal variances of the carrier phase signals as estimated by the variance estimation apparatus 9-6 are supplied to a selection unit 9-7. The selection unit 9-7 contains comparators and compares the signal variances of the carrier phase signals as estimated by the variance estimation units 9-6-i with one another. The selection unit emits a selection signal as a clock phase detection signal ($DS_{TP}$) via a control line to a selection multiplexer 9-8, which indicates that clock polyphase signal whose associated carrier phase has the smallest signal variance $T^2 min$.

In the first embodiment, as illustrated in FIG. 6, the multiplexer 9-5 receives a count via a control line from a counter 9-9, which counts cyclically up to n, corresponding to the number of clock polyphases. The multiplexer 9-5 in this way cyclically emits a carrier phase signal $CPS_i$ as the carrier phase detection signal $DS_{cp}$. The carrier phase signals $CPS_i$ which are emitted cyclically from the multiplexer 9-5 are supplied to a downstream digital filter 9-10, which filters a mean value or expected value out of them and supplies this to the adder 9-2.

The carrier phase detectors TPD, which are arranged in parallel and represent the unit 9-4, the signal variance estimation apparatus 9-6, the selection unit 9-7 and the multiplexer 9-5 together form the detector 10 according to a first embodiment of the invention. As can be seen from FIG. 6, the detector 10 according to the invention simultaneously produces a clock phase detection signal $DS_{TT}$ and a carrier phase detection signal $DS_{cp}$. The clock phase and the carrier phase are thus determined jointly and at the same time. Since the clock phase detection and the carrier phase detection are carried out by means of the same components, the circuitry complexity of the detector 10 according to the invention is very low.

Furthermore, the entire signal length of a training signal sequence is available for the clock phase detection and for the carrier phase detection. In the detector 10 according to the invention, the clock phase is determined and the clock phase detection signal $DS_{TP}$ is calculated from the variance of the carrier phase estimation. The clock phase detection signal and the carrier phase detection signal are determined at the same time and jointly in the detector 10 according to the invention and not sequentially as in the case of conventional, separate control loops.

Figure 7:
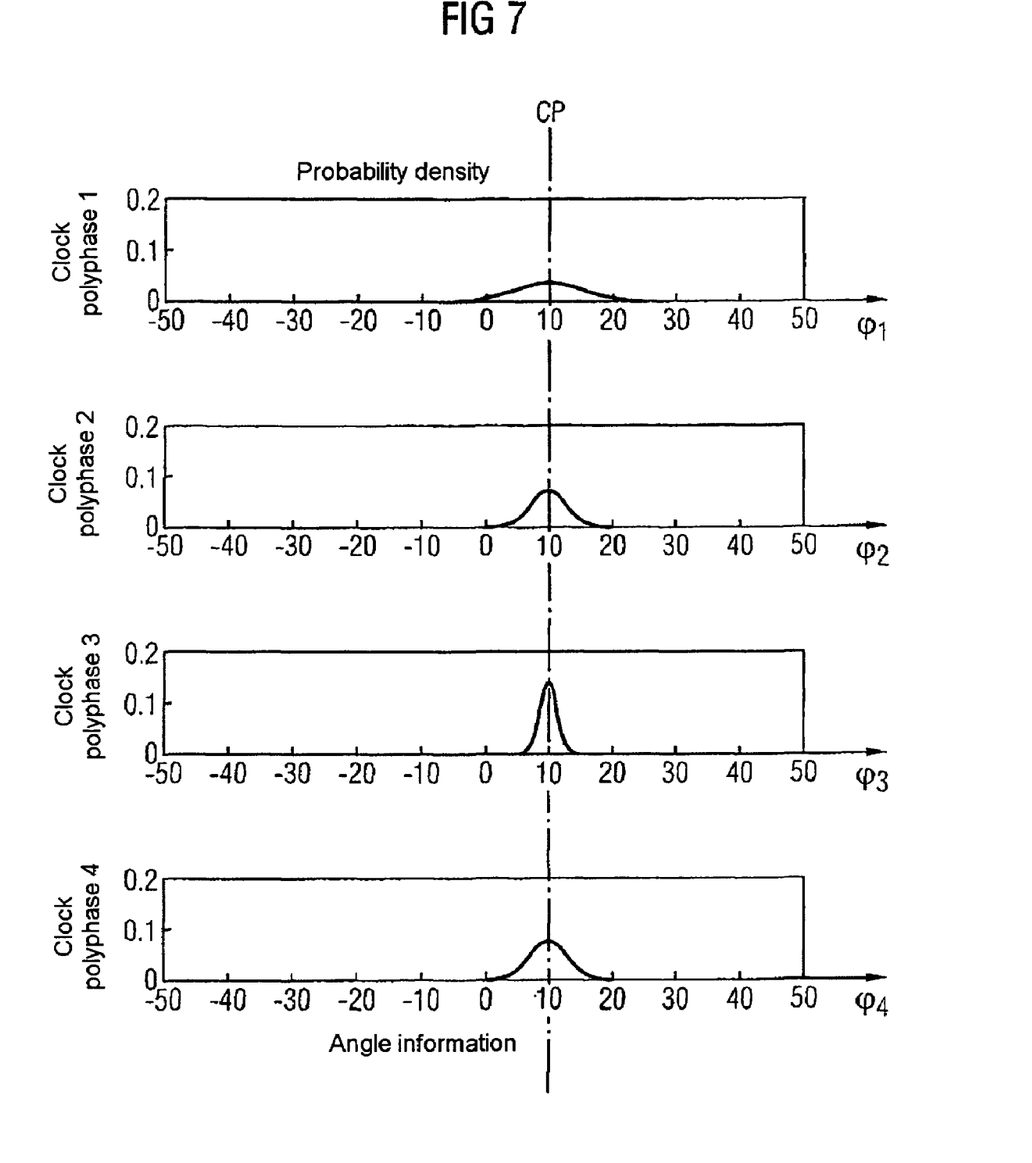
FIG. 7 are diagrams explaining the method of operation of the inventive detector.

FIG. 7 shows the probability density distribution of various clock polyphases as a function of the phase angle $\phi_{in}$ of the received signal, in order to explain the method of operation of the detector 10 according to the invention. The detector 10 determines the clock phase and carrier phase jointly by determination and evaluation of the angle information in the oversampled received signal. The detector 10, which knows the symbol alphabet and the constellation points used, forms the angle information that is obtained by means of the carrier phase detectors in the first sector or quadrant of the complex decision space. The carrier phase is estimated in the detector 10 according to the invention from the mean value of all the available angle information items. For simultaneous determination of the clock phase, the detector 10 according to the invention evaluates the angle information for the individual clock polyphases separately, and in the process makes use of the fact that the signal variance of the angle information is a minimum for the correct clock phase.

In the example illustrated in FIG. 7, the demultiplexer 9-3 emits four clock polyphase signals. The carrier phase and the detection signal for the carrier phase ($DS_{cp}$) are obtained from the mean value of the probability density distribution and, for the given example, are 10°. The carrier phase (CP) is thus 10°. The clock phase TP for the detector 10 according to the invention is determined from the variance of the clock polyphase signals.

Figure 9:
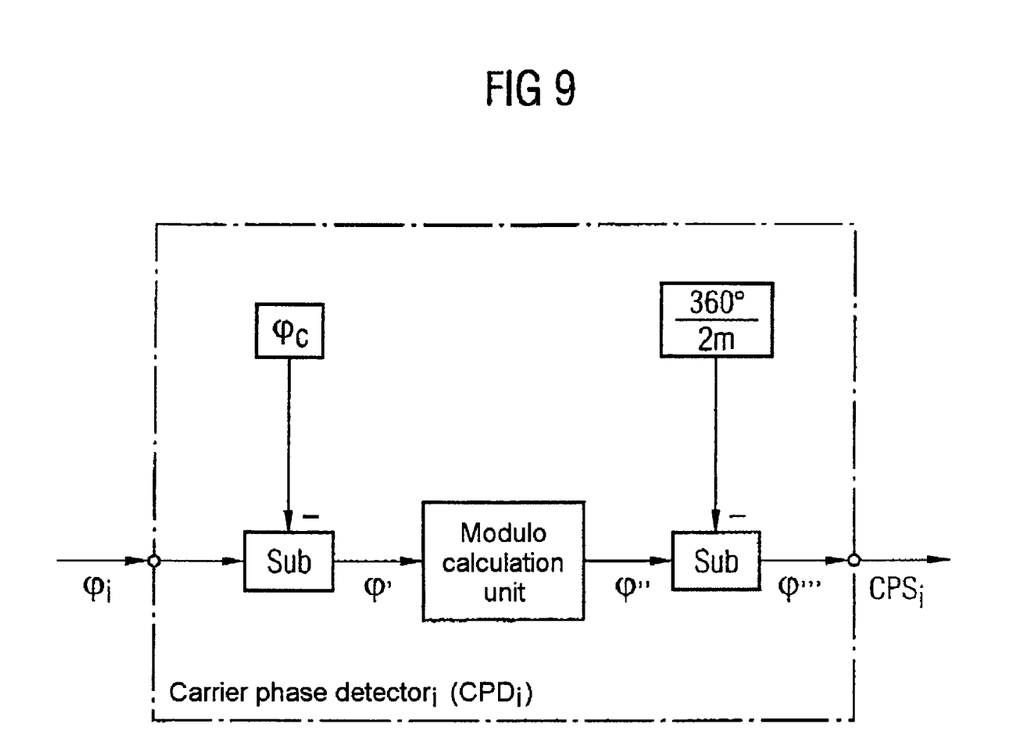
FIG. 9 is a block diagram of a carrier phase detector being within an inventive detector.

FIG. 9 shows the circuitry configuration of a carrier phase detector $TPD_i$ within the unit 9-4 in the detector 10. The carrier phase detector $TPD_i$ contains a first subtractor, which subtracts a constant phase value $\phi_c$ from the clock polyphase signal. The constant phase $\phi_c$ can be used for adjustment. A modulo calculation unit rotates the signal phase produced by the phase subtractor into the first quadrant of the complex plane. On the output side, the phase rotation unit or the modulo calculation unit is connected to a further phase subtractor, which subtracts half the phase separation between two equidistant nominal data symbols from the rotated phase. If the number of nominal data symbols within the complex plane is m, then half the phase separation between two equidistant phase symbols is $$\frac{360°}{2m}.$$

For example, four equidistant nominal data symbols are provided for a 4PSK-modulated signal, and their phase separation from one another is in each case 90°. Half the phase separation is thus 45°. In one preferred embodiment, half the phase separation of $$\frac{360°}{2m}$$

is stored in a programmable memory which is connected to the second phase subtractor. The carrier phase detector emits the difference signal as the carrier phase signal $CPS_i$.

Figure 10:
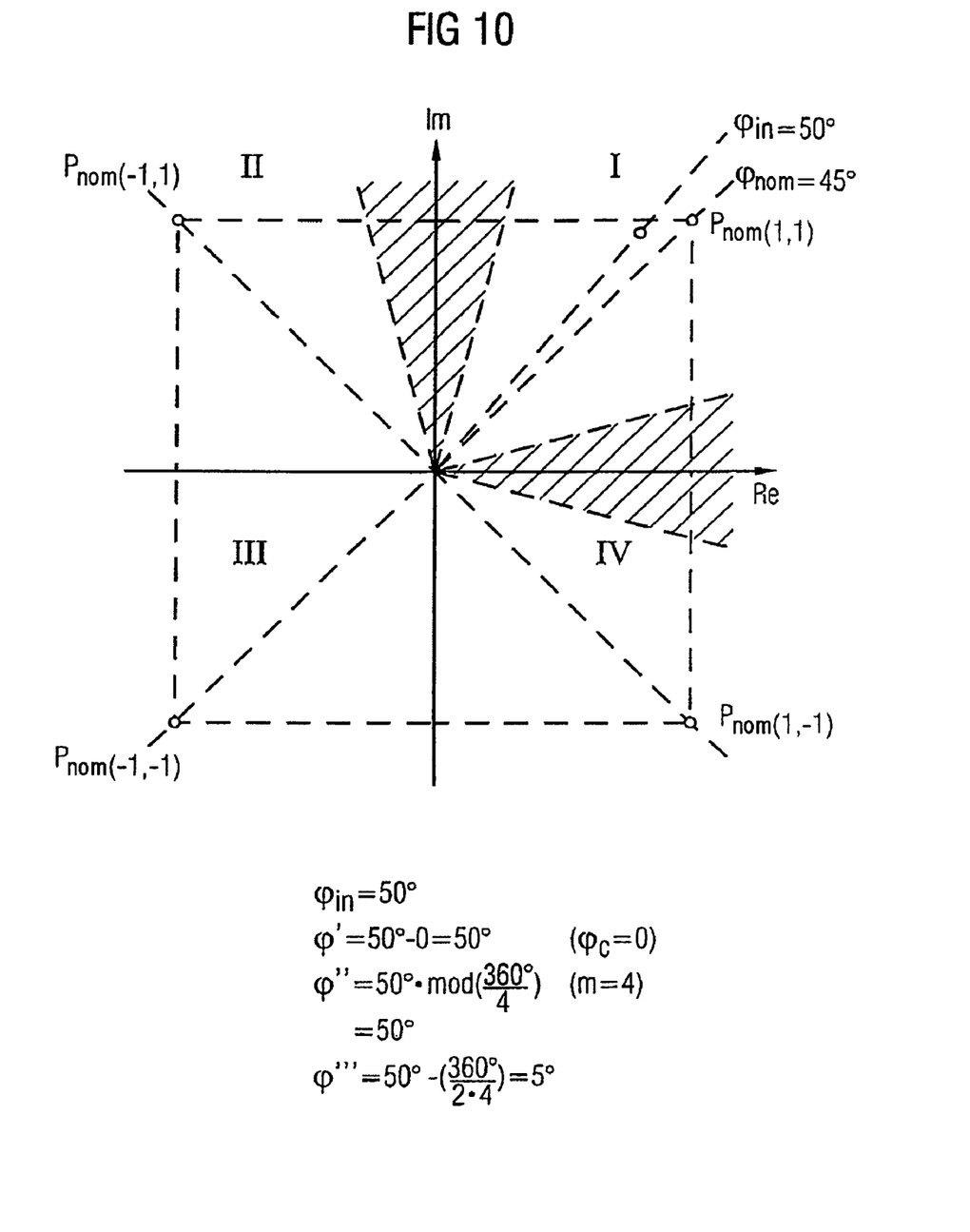
FIG. 10 is a diagram explaining the method of operation of the carrier phase detector illustrated in FIG. 9.

FIG. 10 shows a simple example, in order to explain the method of operation of the carrier phase detector $TPD_i$ illustrated in FIG. 9.

The carrier phase detector $TPD_i$ receives the phase angle $\phi_{in}$ of the associated clock polyphase signal, which in the quoted example is 50°. The phase $\phi_c$, which is intended for adjustment, is 0°. The modulo calculation unit or the phase modulo calculation unit rotates the signal phase from 50° into the first quadrant. Since the phase of the input signal is already located in the first quadrant, it is mapped onto itself, so that $\phi''$ is likewise 50°. The second subtractor subtracts $$\frac{360°}{2 \times 4}$$

so that 5° is emitted to the carrier phase signal.

Figure 11:
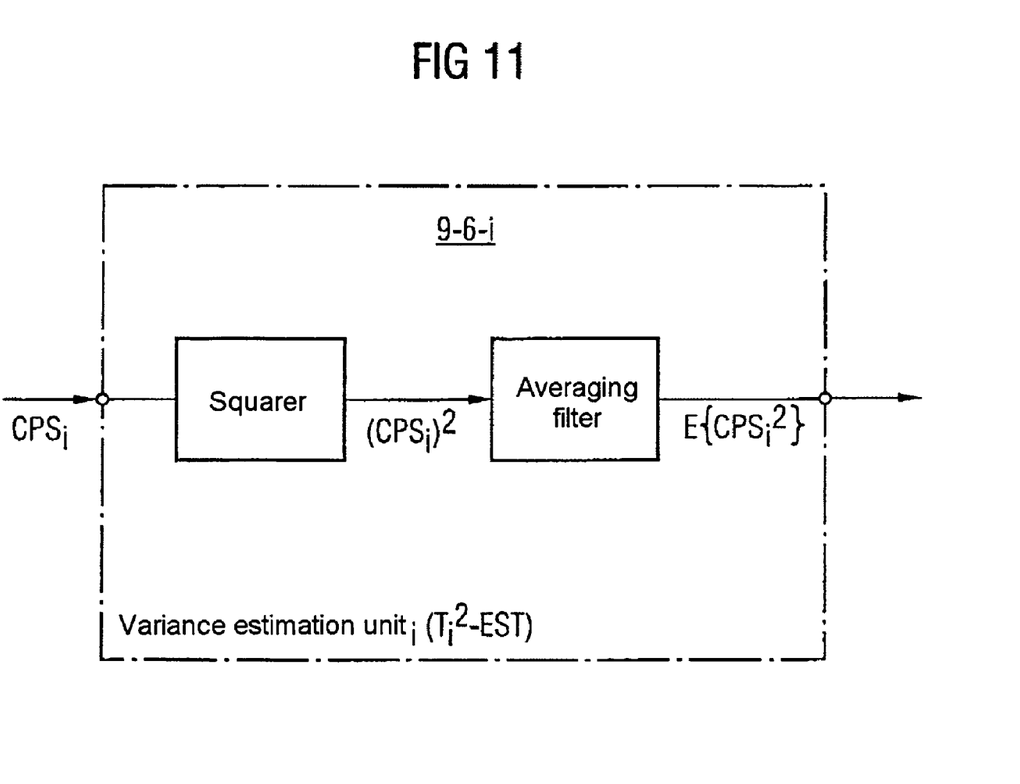
FIG. 11 is a block diagram of a variance estimation unit being within inventive detector.

FIG. 11 shows the block diagram of a variance estimation unit 9-6-i within the variance estimation apparatus 9-6. The carrier phase signal $CPS_i$ which is produced by a carrier phase detector $TPD_i$ within the unit 9-4 is passed via a line to a variance estimation unit 9-6-i, as is illustrated in FIG. 11. Each variance estimation unit 9-6-i within the variance estimation apparatus 9-6 contains a calculation unit, which squares the applied carrier phase signal $CPS_i$ and a downstream digital averaging filter, which emits the expected value or mean value of the carrier phase signal that has been squared by the calculation unit.

As is known:

$$\mu = E(x)$$
$$= \sum_{i=1}^{M} \frac{x_i}{M}$$

and $$\sigma^2 = E[(x - \mu)^2]$$
$$= E(x^2) - \mu^2$$

Since the mean value or the expected value $E(x)$ is the same for all carrier phase signals $CPS_i$, the variance estimation unit calculates the expected value of the squared carrier phase signal $E(CPS_i)^2$.

In the example illustrated in FIG. 7, the variance of the clock polyphase signal 3 is the least of the variances of all the clock polyphase signals. The selection unit 9-7 for the detector 10 identifies by comparison that the variance of the clock polyphase signal 3 is the least, and emits a corresponding clock phase detection signal $DS_{TP}$ to the selection multiplexer, which emits the signal input for the third clock polyphase signal to a signal output $9_c$ of the circuit 9 for clock phase synchronization and carrier phase control. The output $9_c$ of the circuit 9 is connected, as is illustrated in FIG. 5, to the input of a symbol detector 11 within the receiver 1. The symbol detector 11 uses the clock polyphase signal that has been passed on to determine the transmitted data symbol, and emits this to a demapping unit 12.

The data bit stream which is emitted from the demapping unit 12 is supplied to a data processing unit 13 within the receiver 1.

Figure 8:
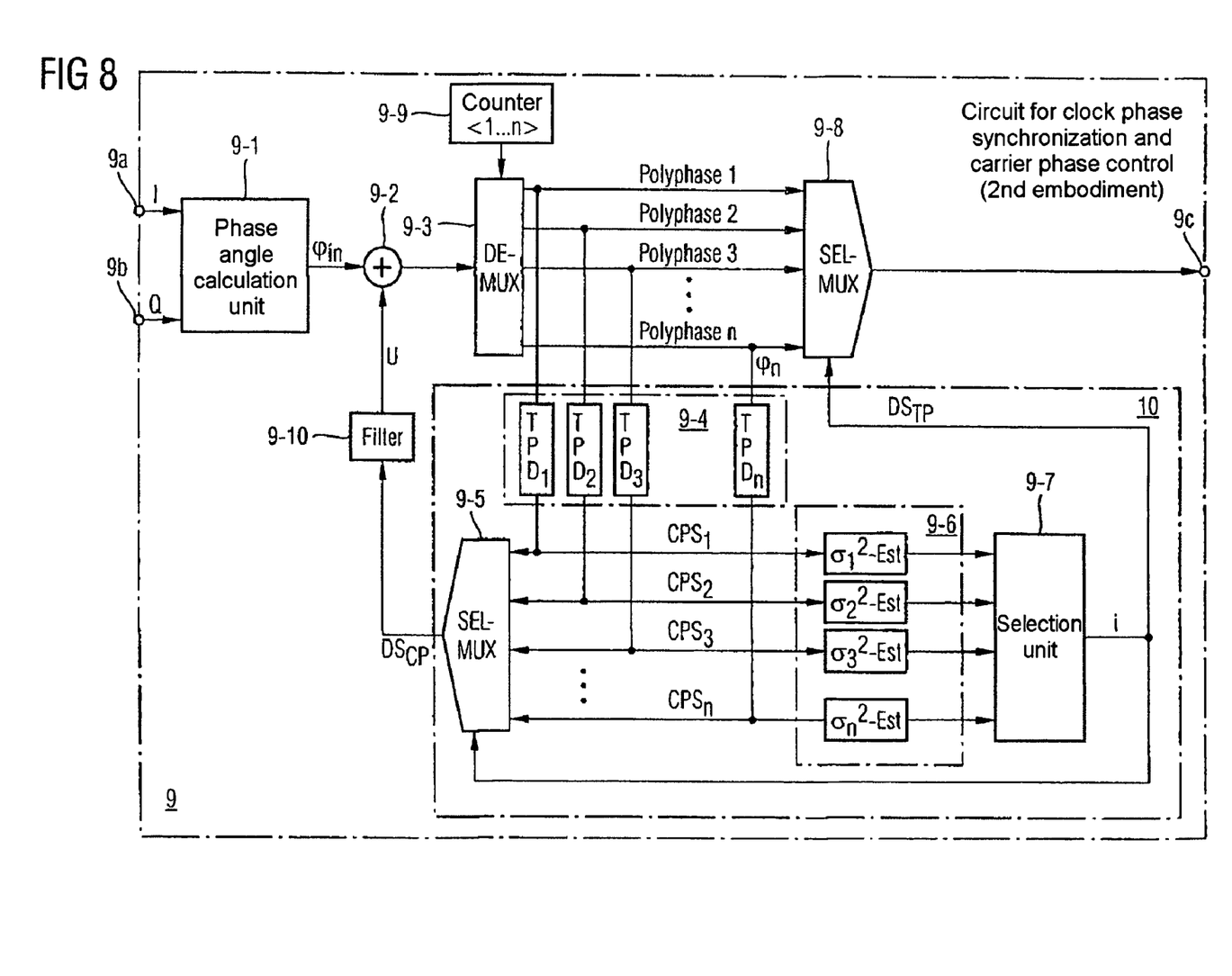
FIG. 8 is a circuit for clock phase synchronization and carrier phase control, which comprises a detector according to a second exemplary embodiment.

FIG. 8 shows a second embodiment of the detector 10 according to the invention.

In this second embodiment, the selection signal which is produced by the selection unit 9-7 is supplied not only to the selection multiplexer 9-8 but also to the selection multiplexer 9-5. The selection multiplexer 9-5 passes on that carrier phase signal $CPS_i$ whose signal variance is the minimum as a function of the selection signal $DS_{TP}$, that is to say the carrier phase signal $CPS_i$ of that clock polyphase which has the minimum or optimum signal variance. In the example illustrated in FIG. 7, the selection multiplexer 9-5 passes on the carrier phase signal $CPS_3$ of the third clock polyphase signal to the downstream filters 9-10.

If only a small number of clock polyphases are available, the estimation of the clock phase TP can be improved by interpolation between adjacent clock polyphases. In the case of the detector 10 according to the invention, it is not necessary to determine the signal variance in an absolute form for estimation, but only to determine a relative measure for the signal variance of the individual clock polyphases, since the mean value is the same for all clock polyphases.

In one alternative embodiment, when the received signal is a differentially modulated, incoherent received signal, the detector 10 according to the invention does not carry out joint detection of the clock phase and carrier phase, but of the clock phase and the carrier frequency.

In a further alternative embodiment, the phase angle ($\phi_{in}$) of the phase angle calculation unit is calculated by means of the so-called CORDIC algorithm rather than by means of the arctan of the real part and of the imaginary part.

Although modifications and changes may be suggested by those skilled in the art, it is the intention of the inventors to embody within the patent warranted heron all changes and modifications as reasonably and properly come within the scope of their contribution to the art.

We claim as our invention:

1. A detector for a receiver; said detector generating a clock phase detection signal and a carrier phase detection signal from of a plurality of clock polyphase signals of an oversampled signal; said detector comprising:
   a plurality of carrier phase detectors, each determining the carrier phase of an applied clock polyphase signal of said plurality of clock polyphase signals and each emitting a carrier phase signal corresponding to said respective carrier phase;
   a plurality of variance estimation units, each determining the variance of one of said carrier phase signals;
   a selection unit which compares the variances of said carrier phase signals with one another and emits a selection signal as said clock phase detection signal for selection of that clock polyphase signal whose associated carrier phase has the smallest variance; and
   an output unit which emits at least one of said carrier phase signals as said carrier phase detection signal.

2. The detector of claim 1, wherin said output unit is a multiplexer whose inputs are connected to said carrier phase detectors and which cyclically passes on said applied carrier phase signals.

3. The detector of claim 2, said multiplexer comprising a control input which is connected to a counter.

4. The detector of claim 1, wherein said output unit is a multiplexer whose inputs are connected to said carrier phase detectors and which passes on said carrier phase signal whose variance is the smallest as a function of the selection signal which is emitted by said selection unit.

5. The detector of claim 1, wherein each of said variance estimation units compromises a calculation unit, which squares the applied carrier phase signal, and compromises a digital averaging filter which emits the mean value of said carrier phase signal which is being squared by said calculation unit.

6. The detector of claim 1, wherein said carrier phase detection signal, which is emitted by said output unit, is emitted to a further digital averaging filter which filters out a mean value of said carrier phase detector signal.

7. The detector of claim 6, compromising an adder which adds said mean value of said carrier phase detection signal and a phase angle input signal to form a sum signal.

8. The detector of claim 1, said oversampled signal being a complex signal having a real signal component and an imaginary signal component.

9. The detector of claim 8, compromising a phase calculation unit, which calculates a phase angle of said oversampled signal as a function of said real signal component and of said imaginary signal component of said oversampled signal, and which emits this as a phase angle input signal.

10. The detector of claim 9, compromising an adder which adds said mean value of said carrier phase detection signal and said phase angle input signal to form a sum signal.

11. The detector of claim 10, comprising a demultiplexer which receives at one of its inputs said sum signal emitted from said adder and subdivided into said clock polyphase signals, each of which is emitted via one of said outputs of said demultiplexer.

12. The detector of claim 11, said demultiplexer comprising a control input which is connected to a counter.

13. The detector of claim 12, wherein said counter is a cyclic counter, which applies a cyclic count to said control input of said demultiplexer.

14. The detector of claim 11, wherein said outputs of said demultiplexer are each connected to one input of a selection multiplexer which is driven by said clock phase detection signal emitted by the selection unit.

15. A detector for a receiver; said detector generating a clock phase detection signal and a carrier frequency detection signal from of a plurality of clock polyphase signals of an oversampled difference-modulated signal; said detector comprising:
   a plurality of carrier phase detectors, each determining the carrier phase of an applied clock polyphase signal of said plurality of clock polyphase signals and each emitting a carrier phase signal corresponding to said respective carrier phase;
   a plurality of variance estimation units, each determining the variance of one of said carrier phase signals;
   a selection unit which compares the variances of said carrier phase signals with one another and emits a selection signal as said clock phase detection signal for selection of that clock polyphase signal whose associated carrier phase has the smallest variance; and
   an output unit which emits at least one of said carrier phase signals as said carrier frequency detection signal.

* * * * *